(No Model.)
T. S. E. DIXON.
SECONDARY BATTERY.
No. 431,447. Patented July 1, 1890.
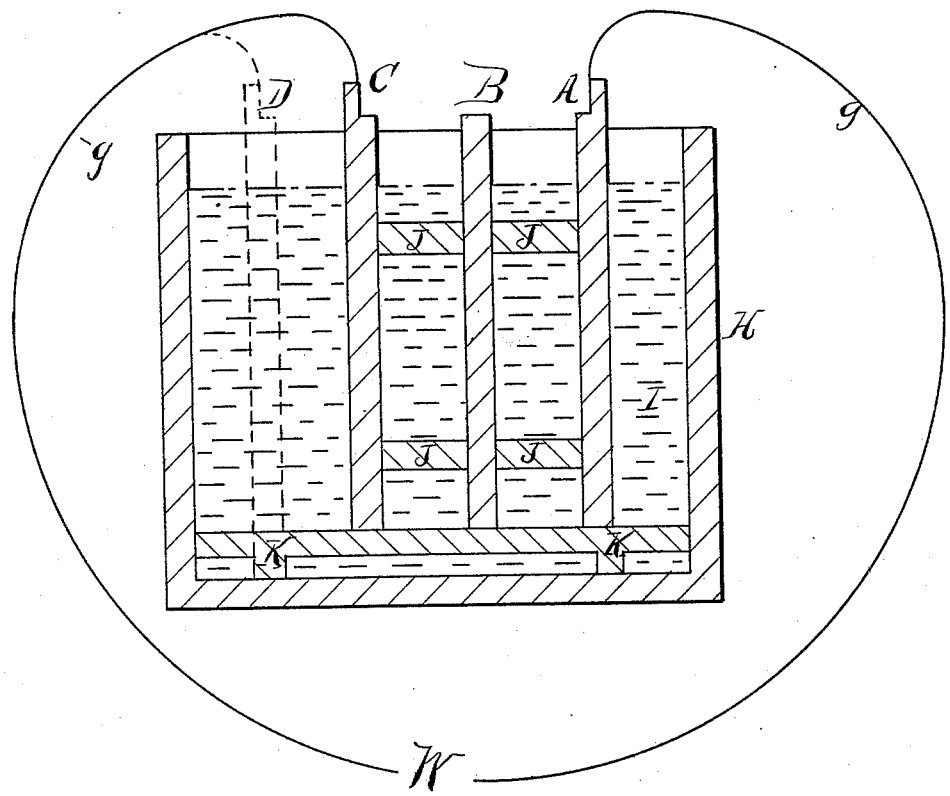
Witnesses
Harry Bitner
W. W. Hill
Inventor
T. S. E. Dixon
By Hill & Dixon,
His Attys.

UNITED STATES PATENT OFFICE.

THERON S. E. DIXON, OF CHICAGO, ILLINOIS.

SECONDARY BATTERY.

SPECIFICATION forming part of Letters Patent No. 431,447, dated July 1, 1890.

Application filed February 6, 1890. Serial No. 339,406. (No model.)

*To all whom it may concern:*

Be it known that I, THERON S. E. DIXON, a citizen of the United States of America, residing at Chicago, in the county of Cook and State of Illinois, have invented certain new and useful Improvements in Electric Batteries, of which the following is a description.

The storage-battery cell as at present constructed contains in the dilute sulphuric-acid fluid two electrodes, usually in the form of grids, holding the active material which, when the cell is charged, becomes, for example, peroxide of lead upon the so-called "positive" electrode and spongy lead upon the negative electrode. The usual electro-motive force of such a cell when charged and put into use is about two volts. The whole of the charge cannot be practically utilized, for when in the discharge of the cell the electro-motive force falls below one and nine-tenths volts the effect upon the plates is injurious, ultimately causing their destruction.

I have discovered that if a third electrode—for example, a plate of zinc—is inserted in the cell in the relative order of, first, the per-oxide-of-lead plate; second, the spongy-lead plate, and third, the zinc plate, detached from conducting metallic connection with each other, and with the circuit connected, respectively, to the peroxide-of-lead plate and the zinc plate, the electro-motive force of the cell becomes about two and one-half volts, affording an increase in the electro-motive force of the cell of about twenty-five per cent. So far as this increase of electro-motive force is concerned, the presence of the smallest piece of zinc on the end of the conducting-wire when it touches into the electrolyte produces the same increase; and if in place of zinc a piece of aluminium be employed the increase of electro-motive force is about one-half of that given by a third electrode of zinc, or about two and one-half tenths of a volt.

In general any third electrode may be employed which has a so-called "negative" differential of potential from that of the spongy-lead plate, and this difference of potential will be added to the electro-motive force of the cell. In like manner the addition of an electrode at the opposite side of the peroxide-of-lead plate, which has a so-called "positive" differential of potential from the peroxide-of-lead plate, will add the amount of this differential to the electro-motive force of the cell. Moreover, electrodes of the proper potential may be inserted between the outer electrodes in a cell. For example, a perforated plate or bar of copper or silver may be inserted between the peroxide and the spongy-lead plates, and likewise four or more electrodes may be employed, as plates of peroxide of lead, copper, spongy lead, and zinc in the order mentioned. The addition of such intermediate electrodes, however, while they take a part in the operation of the battery, does not add to the original electro-motive force of the cell. The law, so far as I have discovered it, is that when the several electrodes are arranged in the order of their respective electro-motive potentials to each other the total electro-motive force of the cell is always equal to the sum of the potential differentials of the respective plates in the order of their arrangement. The difference of electro-motive potential between any two electrodes is readily ascertained by observing the direction and extent of the movement of the needle of a voltometer in the circuit when the terminals are attached to such electrodes. The intermediate electrodes, moreover, coact with the exterior electrodes in other respects. Take, for example, the simple case first mentioned of the three electrodes, plates of peroxide of lead, spongy lead, and zinc in a cell containing as an electrolyte the ordinary aqueous solution of sulphuric acid. For this purpose I have employed the storage-plates of the Anglo-American Storage Battery Company, which are each six by six inches in dimension. I have taken the peroxide-of-lead plate as one electrode and placed in the cell with it a small strip of zinc as the other electrode, and "short circuited" the cell. The current of electricity flows through the circuit without any immediately visible change in the elements, though of course chemical action is taking place. I have then inserted the spongy-lead plate as an intermediate electrode between the peroxide plate and the strip of zinc, when immediately the action upon the small strip of zinc is so intensified that it becomes both audible and visible in the sizzling and rise of bubbles which occur. By substituting for the strip of zinc an amalgamated zinc plate of the same or a larger size than the other plates and putting the cell at work the increased surface of the zinc is enabled to perform its function without the production of ebullition. I have found, moreover, that the presence of an intermediate or third electrode performs the very important function of increasing what may be termed the "staying power" of the cell. With a cell containing the three electrodes mentioned—peroxide of lead, spongy lead, and zinc plates, respectively—several times the electrical energy is evolved and flows through the circuit before the fall in the electro-motive force of the cell occurs to the danger-point of one and nine-tenths volts, before mentioned, that there is evolved in the cell containing only the two electrodes, peroxide-of-lead and spongy-lead plates. Moreover, when the three electrodes are employed, the period during which the fall of the electro-motive force of the cell occurs to the point mentioned is prolonged to beyond that which occurs when only two electrodes are employed, whether they be the peroxide of lead and the spongy lead or the peroxide of lead and the zinc, respectively.

I am unable as yet to fully explain the philosophy of this somewhat remarkable "staying" power exhibited in a cell containing multiple electrodes. Some light may be thrown upon the phenomenon, however, by certain observations I have made.

When the three electrodes last mentioned are employed and the cell is gradually exhausted, I have observed, by making tests from time to time, that with the fall of electro-motive force of the cell, while the difference of electro-motive potential between the peroxide plate and the other plates gradually falls, the difference of potential between the second and the third plates—to wit, between the spongy-lead and the zinc plates—remains substantially constant throughout the period of discharge of the cell, such difference of potential remaining constantly at about one-half a volt. I believe that the introduction of this constant into what was before a "variable" battery contributes powerfully to the staying electro-motive power of the battery, obviously since a portion of the total current then flowing from the cell is not subject to variation in its electro-motive force. Taken in connection with the law already mentioned, that in any cell with multiple electrodes properly arranged the total electro-motive force of the cell is at all times equal to the sum of the potential differentials of the respective electrodes in the order of their arrangement, these observations appear to make evident the general law for guidance that in any battery, whether "reversible" or not, in which the cell contains two electrodes, and whose normal electro-motive force diminishes during continued action, the staying electro-motive power of the cell is, in general, increased by the addition of another electrode or electrodes, whose difference of electro-motive potential from either or all of the other electrodes is more constant, or rather less variable than is such difference of potential between the original two electrodes. This arrangement of multiple electrodes in the cell of any battery secures a material advantage over the two-electrode cells for many purposes, especially when a constant continued electro-motive force is desirable. The details of arrangement may be varied in the great variety of batteries and in many ways without departing from the principle of my invention. Thus in the cell containing the three electrodes already repeatedly mentioned the peroxide-of-lead plate may be produced chemically or by the action of a current of electricity upon red-lead paste, or some other positive electrode may be substituted for it in the combination, or some other negative electrode may be substituted for the zinc plate, or a plate of metallic lead may be substituted for the intermediate electrode of spongy lead, or a piece of other metal of the proper electro-motive potential may be substituted, or other electrodes may be added in the order of their relative potential.

In the special case of a storage-battery where the cell is charged by the passage through it of a current of electricity the power of the cell is greatly re-enforced by the addition of a third electrode. Thus in the cell before mentioned, with the two lead grids holding the active material, the addition of a third electrode of zinc both adds to the electro-motive force of the cell and increases its ampèrage, thus largely increasing the total available electrical energy of the battery. This affords a material re-enforcement to its power over that which is available in its usual form with only the peroxide-of-lead and spongy-lead electrodes.

For convenience of designation I term a battery in which the cell contains three electrodes a "triple-electrode battery." Where four electrodes are combined in the cell, I term the battery a "quadruple-electrode battery," and, in general, where more than two electrodes are combined in the cell I term the battery a "multiple-electrode battery."

In the drawing the figure is a cross-section of a battery-cell, illustrating a convenient arrangement where multiple electrodes are employed.

In the figure, H represents a cell, which may be of any appropriate form, and which contains a suitable electrolyte I. The three electrodes A, B, and C are placed in the cell, preferably upon hard rubber bars K, resting upon the bottom of the cell, and are separated by hard rubber bars or studs J. The three electrodes are arranged in the order of their electro-motive potential, the more positive one A upon one side and the more negative one C upon the other side, with the one of intermediate potential B preferably between them. The circuit-wires $q$ are attached to the electrodes A and C, respectively, and the circuit is completed at W in the usual manner for the performance of any work. Another electrode is shown in dotted lines at D in case four electrodes are employed, the circuit-wire $q$ in such case being connected with D instead of C, care being taken to connect the circuit wires respectively to the two electrodes at the extremes of the electro-motive potential.

Having thus described my invention, what I claim as new, and desire to secure by Letters Patent, is—

1. As an improvement in electric batteries, a secondary battery-cell provided with two or more charged plates and one or more supplementary plates differing in their respective electro-motive potentials, substantially as described.

2. As an improvement in the art of the production of electricity, the method of re-enforcing secondary batteries, which consists in adding to the usual electrodes one or more electrodes of different electro-motive potential, whereby an increase of the available electrical energy of the cell is afforded, substantially as described.

3. In a battery-cell, the combination of two electrodes provided, respectively, with peroxide of lead and spongy lead, with a third electrode of zinc, substantially as described.

THERON S. E. DIXON.

Witnesses:
H. L. NORTON,
JAMES HOULEHAN.